United States Patent [19]

Braun

[11] 4,033,506
[45] July 5, 1977

[54] ELECTROSTATIC COATING GUNS

[76] Inventor: Franz Braun, Wartbuchel 14, 9422 Staad, near Rorschach, Switzerland

[22] Filed: Aug. 1, 1975

[21] Appl. No.: 600,975

[30] Foreign Application Priority Data

Aug. 6, 1974 Switzerland ............... 10761/74
Aug. 6, 1974 Switzerland ............... 10762/74
Aug. 6, 1974 Switzerland ............... 10763/74

[52] U.S. Cl. .................. 239/15; 361/228; 363/59
[51] Int. Cl.² ........................... B05B 5/02
[58] Field of Search .......... 239/3, 15; 317/3; 321/15

[56] References Cited

UNITED STATES PATENTS

| 3,608,823 | 9/1971 | Buschor | 239/15 |
| 3,731,145 | 5/1973 | Senay | 239/15 X |
| 3,841,264 | 10/1974 | Masuda | 239/15 X |

Primary Examiner—Evon C. Blunk
Assistant Examiner—Michael Mar
Attorney, Agent, or Firm—Larson, Taylor and Hinds

[57] ABSTRACT

Electrostatic coating guns are described wherein a conduit for coating material extends from a handle part, and a high-tension electrostatic generator, constructed as a block or unit, may be replaceably mounted on the handle part. The high-tension generator consists of an electrostatic cascade device wholly embedded in an insulating moulded composition and arranged to apply full high tension to the muzzle and of the gun, this high tension decreasing towards the handle part. The conduit may be a bore moulded in the insulating composition, or it may be a rigid tube, on which the bore in the generator is a sliding fit, or on which the generator may be clamped. In another alternative, the generator is detachably located in the handle part. The electrostatic cascade components may be contained in sleeves consisting of two or more contacting layers of insulating material, the layers being made of material having different dielectric constants and different mechanical strengths. Thus, there may be a layer having a high dielectric constant close to the cascade component and surrounded by a mechanically stronger layer having a lower dielectric constant.

13 Claims, 15 Drawing Figures

ELECTROSTATIC COATING GUNS

FIELD OF THE INVENTION

The invention relates to electrostatic coating guns having a handle part, a conduit for coating material, a device for applying high tension to the gun nozzle and a high-tension generator.

DESCRIPTION OF THE PRIOR ART

Electrostatic coating guns are known and usual in various forms. For example, forms are known in which the high-tension generator is arranged as a separate component and connected with the gun only by means of a high-tension lead. Forms of coating apparatus are also known in which the high-tension generator is inseparably connected with the gun or arranged as an integral component thereof.

In such inseparable or integral forms of coating apparatus there is the disadvantage that the high-tension generator arranged in the gun is accessible only with difficulty, if at all, for repair work, and that damage to the high-tension generator necessarily leads to failure of the entire coating apparatus.

On the other hand the handling of a coating apparatus with a separately arranged high-tension generator is difficult, especially with regard to the handling and guidance of the high-tension lead.

A great disadvantage of known high-tension generators, particularly those for use in high tension spray guns and insulating jacket of which is produced either by machining of solid material or by casting in moulds, consists in that in order to achieve the requisite insulation of the components under high tension on the one hand and the mechanical strength on the other, voluminous and heavy formation of the insulating body, and thus of the high-tension generator itself, is necessary. This is primarily because cost-favourable insulation materials with good electrical properties mostly have inadequate mechanical and chemical properties.

One disadvantage of the known capacitor arrangements as used in electrostatic spray guns consists in that for the formation of a capacitor series having a number of series-connected capacitors the latter must be arranged in series and prior arrangements require expensive and labour-intensive production and result in a bulky formation.

A further disadvantage of the known capacitor arrangements consists in that in order to achieve the necessary electric strength these arrangements on the one hand must posess inconvenient and bulky shaped and on the other hand considerable demands are made of the dielectric as regards it mechanical properties, so that the dimensions on the one hand and the costs of the dielectric on the other do not permit economical production of capacitors, when series connected.

SUMMARY OF THE INVENTION

One aspect of the invention is based upon the problem of avoiding the disadvantages of the prior art, that is especially of producing a coating gun which is simple to handle, can be returned rapidly to operation in the case of damage to the high-tension generator and furthermore can be produced and used simply and economically.

According to this aspect of the invention this problem is primarily solved in that the high-tension generator is formed as a self-contained block and is replaceably secured to the handle part.

As may be seen, thus not only are simple fitting and dismantling of the coating gun rendered possible, but the way is open advantageously for converting conventional coating guns into electrostatic coating guns by means of an appropriate conversion kit.

The high-tension generator can be especially simply fitted to the handle part if the generator is elongated and adapted to the form of the gun barrel or conduit for coating material. Thus in the simplest way and with avoidance of high-tension leads, the generator voltage can be fed directly from the input of the high-tension generator to the gun muzzle or nozzle.

The invention can be realised especially advantageously in practice if the coating material conduit is provided in the interior of the high-tension generator. The coating material conduit is then additionally protected against mechanical damage and furthermore there is a saving of weight and space.

The problem of fitting of the coating material conduit in a fluid-tight manner in the handle part can be avoided if the high-tension generator is made approximately cylindrical and has a longitudinal bore through which the coating material conduit can simply be pushed. In this way the subsequent conversion of conventional coating guns can be achieved very simply in that a coating material conduit formed in practice as an extension tube is firstly secured on the gun and then the high-tension generator is pushed over the conduit for coating material and secured to the handle part.

Especially simple replacement of the high-tension generator and a simple and easy overall arrangement result if the coating material conduit is a fixture in the high-tension generator and the high-tension generator can be attached to the handle part in such a way that a fluid-tight connection is produced between the supply conduit provided in the handle part and the coating material conduit.

The term "fluid-tight" within the meaning of this application of course also covers seals that are "powder-tight" where coating media in powder form are used.

Further simplification of the mechanical assembly can be achieved if, when a high-tension generator cast in insulating material is used, the coating material conduit is cast in the insulating material during the formation of the motor. Further saving of weight and insulating material, particularly when extremely high tensions are to be used, can be achieved if the coating material conduit itself consists of insulating materials that are stable in the presence of the pressure and chemicals to be met in practice, the conduit being formed as a longitudinal passage in the high-tension generator. In this case the nozzle of the conduit can be readily subjected to high tension by a device fitted directly on the front opening of the longitudinal passage in the high-tension generator.

Extremely rapid replacement of the high-tension generator and the simple possibility of subsequent conversion of conventional coating guns are also obtained according to the invention if the coating material conduit is secured as an extension pipe on the handle part and the high-tension generator is fittable laterally to the coating material conduit. Effective mounting and good mechanical protection of the coating material conduit result if the high-tension generator has a groove into which the coating material conduit fits when the coating gun is in the assembled condition.

Depending on the formation of the high-tension generator it is possible, and in certain cases advantageous, for the generator to be arranged elsewhere in the gun, for example in the handle part of the gun, without thereby departing from the scope of the invention.

A further object of the invention is to produce a high-tension generator of the above described kind which renders possible a simplified and cheapened production and furthermore permits the use of cost-favourable, highgrade insulation materials with low mechanical and chemical properties, so that the production of light generators with small volume is achieved.

According to the invention this is achieved primarily in that the insulating jacket of the electrostatic generator consists of at least two insulating layers, lying one above the other, with different permittivities (i.e. dielectric constants), the outer layer having the greater mechanical strength.

Thus in a simple manner it is possible to achieve both cheapened and simplified production of high-tension generators and very good electric, mechanical and chemical properties, with low weight and volume, since the outermost insulating layer or layers ensure the mechanical strength and chemical stability and the inner insulating layer or layers ensure good electric properties such as dielectric strength, specific resistance per unit volume and non-cracking quality.

In an advantageous embodiment of the invention the insulating layers can be stuck, cemented and/or shrunk on to one another, whereby especially small dimensions and thus small volume of the high-tension generator can be achieved.

In another development of the invention the insulating layers are cast into one another, it being possible for the outermost insulating layer to serve as a casting mould for the inner insulating layers, whereby futher simplification and cheapening can be achieved in the production of high-tension generators, since neither expensive pre-treatment of the outer insulating layer or casting mould nor finishing work on the cast inner insulating layers and/or of the entire generator assembly is necessary. Moreover, in this case, it is not necessary to clean the casting mould nor to remove a casting from the mould.

Especially advantageous electrical properties can be achieved with small dimensions and weights, if the insulating jacket consists of two insulating layers and if the inner insulating layer consists of a toughly plastic or permanently elastic moulding composition having favourable electrical properties.

In a further modification, the high-tension generator is moulded by means of different insulating layers having different dielectric constants concentric with one another, whereby a field intensity control can be achieved within the insulating jacket.

Such control of the field intensity in a very simple manner renders possible a considerable increase of the dielectric strength with constant wall thickness or a considerable reduction of the dimensions with constant dielectric strength. This is primarily because the field intensity control reduced the field intensity in the inner region of the concentric arrangement and thus the loading of the insulating material. On the other hand, a harmless increase of the field intensity can be achieved in the outer and more voluminous region of the concentric arrangement.

In a high-tension cascade having concentric overall construction, the various insulating layers concentric with one another can advantageously be arranged so that the insulating layer with the highest dielectric constant is arranged directly on the components under high tension and the insulating layer with the lowest dielectric constant is arranged at the greatest distance from the components under high tension.

With a specific permissible weight of the coating gun, by the formation of the jacket in accordance with the invention it is possible to achieve a longer and slimmer gun body, whereby the use of high tensions is rendered possible as a result of greater breakdown and/or flashover distances between the gun mouth on the high-tension side and the earthed gun handle. Thus moreover it is possible to achieve both reduced spray-back with a given tension and also the working of water-soluble varnishes.

A further problem of the invention is to produce a capacitor assembly for an electrostatic spray gun which in a simple manner renders possible the production of a capacitor series having a number of series-connected capacitors, while furthermore economic savings are achieved.

The invention further has the aim of providing a capacitor series for a spray gun having small volume and low weight.

In accordance with this aspect of the invention, this is primarily achieved in that at least three mutually insulated capacitor plates are provided which are arranged in alternation on opposite sides of the dielectric in such a way that the capacitor plates of the one side of the dielectric at least partially overlap the capacitor plates of the other side of the dielectric, so that at least two series-connected partial capacitors are formed, the number of which in total is less by one than the number of the capacitor plates.

Thus in a simple manner economical production of a capacitor series having a number of series-connected capacitors is achieved, since the application of the various capacitor plates to the dielectric at the same time facilitates their electrical series connection and enables a relatively inexpensive dielectric without specific mechanical properties to be used. Since the dielectric should be thin, in order to achieve a specific capacitance value, and since moreover connecting leads and terminals are not required for the series-connection of the individual capacitors, the dimensions of the capacitor series are considerably reduced.

The dielectric can advantageously be made in strip form, whereby the production and use of the capacitor series can be further simplified, since the dielectric in strip form can be secured without difficulty to coating material conduits of spray guns and furthermore capacitor series can be placed one upon the other, coiled or stacked as desired.

The capacitor plates can advantageously be produced by the application of liquid metal compounds which dry out. If the use of plates of greater thickness is necessary, these can be secured by adhesive or cemented to the dielectric or even fused to it, provided that the dielectric consists of suitable material. Reliable fixing of the capacitor plates can also be achieved by moulding the entire assembly or dielectric and plates in a moulding material.

In another assembly the capacitor plates consist of conductive layers, the metal being vaporised into the dielectric. The dielectric can consist, of a mechanically rigid or elastic material and particularly of synthetic plastics foil, ceramic material, paper or the like, or advantageously of "Mylar" foil.

The capacitor assembly permits a simple adaption of the capacitor values by variation of the overlapping effective capacitor regions; this is especially advantageous for obtaining a good quality high-tension cascade, having regard to the ripple factor of the voltage. Moreover, the intervals between the edges of the capacitor plates can be adjusted to the values necessary as regards dielectric strength and for example in the case of a high-tension cascade, as regards decreasing voltage differences between the individual cascade stages, these intervals being reduced correspondingly, producing a further saving of volume and weight.

The dielectric can be arranged in a plurality of strips each having a plurality of part capacitors, and the dielectric with the part capacitors can be arranged in series around the coating material conduit of the spray gun in such a way that the electrostatic tension or potential increases from the handle part of the spray gun to the muzzle end.

As may be seen, the technical progress and inventive content of the object of the application are achieved both by the new individual features and especially by combination and sub-combination of the utilised features.

DESCRIPTION OF THE DRAWINGS

Examples of the invention are explained in greater detail hereinafter with reference to the accompanying drawings, wherein:

As shown in FIG. 1 a coating gun 1 comprises a handle part 2 to which a high-tension generator 4, having a high-tension electrostatic cascade 9 is secured by means of a cap nut 3. A coating material conduit 5 is moulded firmly into the high-tension generator 4 and is connected in fluid-tight manner by a tapered sealing element 6 with a supply conduit 7 extending within a handle part 2. Thus, the diagrammatically shown high-tension cascade 9 is moulded with insulating moulding composition into the high-tension generator 4, which is formed in practice as a gun barrel and has a nozzle device 8 on its front for spraying the coating medium. The current supply to the high-tension generator 4 takes place through a lead 10 while the application of high-tension to the nozzle device 8 takes place in a reliably insulated and contact-secure manner through a connecting lead (not shown) with the high-tension output of the high-tension generator 4. The coating material conduit consists of chemically and mechanically stable material and as indicated above is cast in the high-tension generator as an integral component. Full high tension is applied to the device 8 and decreases to zero towards the handle part 2.

As may be seen the high-tension generator 4 can be removed from the handle part 2 by simple unscrewing of the cap nut 3 without difficulty and without any expenditure of time, for example for replacement or cleaning purposes.

Figure 1:
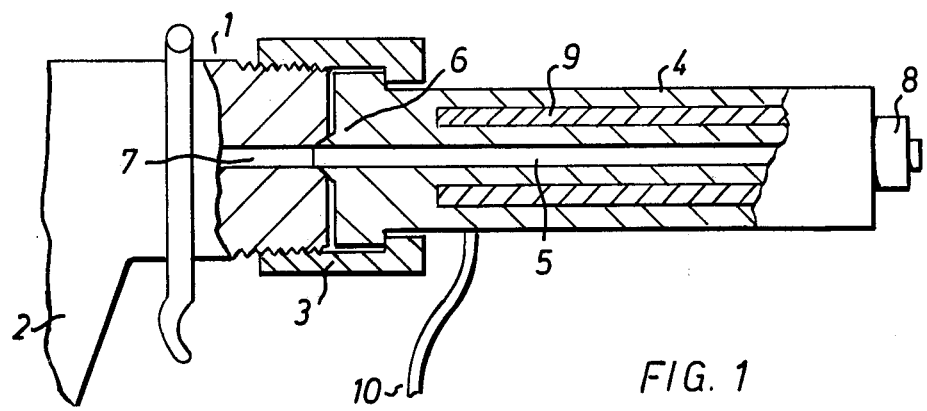
FIG. 1 is an elevation of an electrostatic coating gun shown in partial section.
Figures 2, 2A:
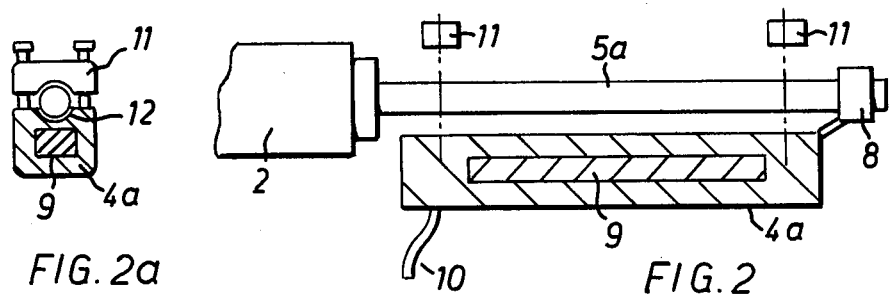
FIG. 2 is a diagrammatic partial elevation of a modified form of the spray gun of FIG. 1, shown in partial section and with parts separated from one another.
FIG. 2a is a cross-section through the modification of FIG. 2, showing the parts assembled.

FIGS. 2 and 2a show a modified example in which a coating material conduit 5a formed as extension pipe, with nozzle device 8 is detachably arranged in a conventional coating gun (not otherwise shown). For the complete conversion of the conventional coating gun to electrostatic operation it is merely necessary to secure the high-tension generator 4a by means of two clamps 11 on the coating material conduit 5. As may be seen the conversion operation or equally the replacement of the high-tension generator 4a can be done very quickly even by untrained personnel. To protect the coating material conduit 5a against mechanical damage the high-tension generator 4 has a groove 12 which fits on the conduit 5a.

Figure 3:
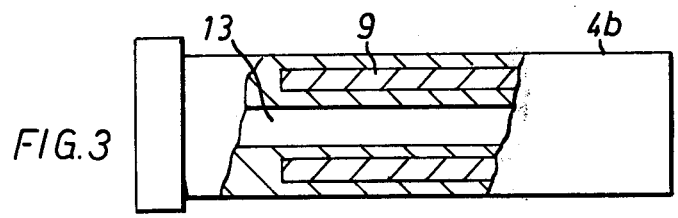
FIG. 3 is an elevation of a high-tension generator shown in partial section, for a spray gun.

FIG. 3 shows a high-tension generator 4b which is likewise usable in combination with a coating material conduit 5a, formed as an extension pipe, as in FIG. 2. In contrast with the high-tension generator 4a of FIG. 2, the high-tension generator 4b has a central bore 13 that can be fitted over the coating material conduit. This form of construction especially renders possible symmetrical and mechanically firm formation of the high-tension generator 4b and furthermore guarantees reliable protection of the coating material conduit, since the latter is substantially completely contained in the longitudinal bore 13.

Figure 4:
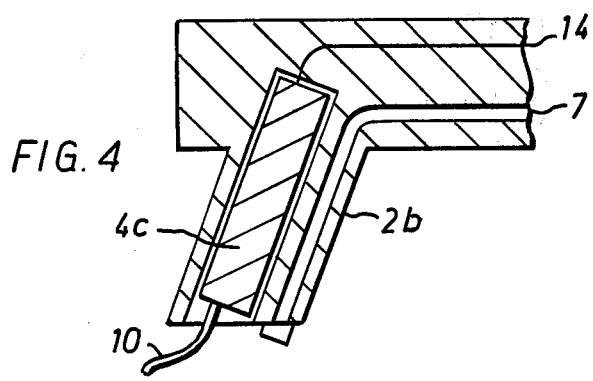
FIG. 4 is a diagrammatic sectional elevation of a handle part of an electrostatic coating gun with an inserted high-tension generator.

FIG. 4 shows a handle part 2b of an electrostatic coating gun in which the supply conduit 7 extends along the part 2b in such a way that a high-tension generator 4c can be arranged in the centre of the handle part 2b. The handle part 2b is produced from insulating material and is shaped to screen the high-tension generator 4c from the conduit 7. At the high-tension output of the high-tension generator 4c a high-tension lead 14 is provided which in a manner known per se leads to the nozzle end and the nozzle device of the coating gun in order to apply high tension to the issuing coating material.

Figure 5:
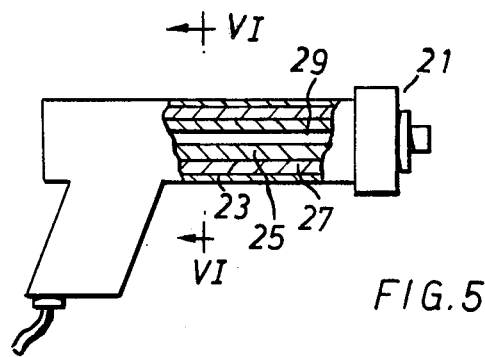
FIG. 5 is a sectional elevation of a coating gun, shown partly in section.
Figure 6:
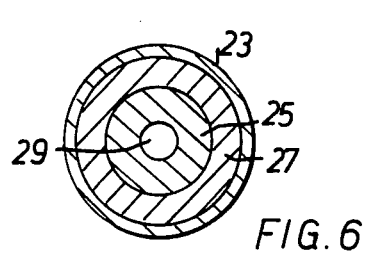
FIG. 6 is a section along the line VI—VI in FIG. 5 on a larger scale.

As may be seen from FIGS. 5 and 6, an electrostatic coating gun 21 consists of a gun jacket 23 in which a high-tension cascade 25 is durably moulded by means of moulding compositions 27, the latter at the same time filling out interspaces in the high-tension cascade 25. The high-tension cascade 25 in here formed concentrically with a conduit 29 for coating material. The coating material conduit 29 is here manufactured from a pressure-proof chemically and mechanically resistant insulating material, whereby moreover insulation of the parts conducting high tension from the coating material is achieved. As may be seen clearly from FIG. 6, the gun jacket 23 serves as casting mould for the moulding compositions 27. By appropriate selection of the material of the gun jacket 23 and suitable shaping and dimensioning thereof it is possible without difficulty to achieve the requisite electrical and mechanical strengths and the chemical stability of the gun jacket.

Figure 7:
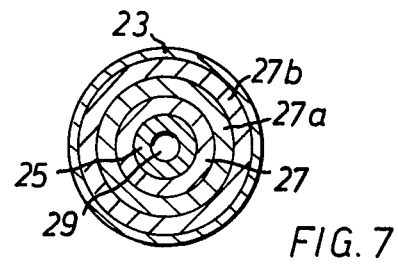
FIG. 7 is a section analogous to FIG. 6 through a high-tension generator.

FIG. 7 shows a high-tension generator in cross-section, from which the various concentrically arranged moulding compositions 27, 27a, 27b may be seen. The values of the respective relative dielectric constants here decrease in the radial direction outwards, whereby control of the field intensity within the moulding compositions is achieved. Since the dielectric constant of the moulding composition 27 is greater than that of the moulding composition 27a, and the dielectric constant of the moulding composition 27a is greater than that of the moulding composition 27b, the highest field intensity occurs within the moulding composition 27b with the greatest volume and the lowest field intensity within the moulding composition 27, whereby obviously a relief of the insulating material is achieved. Of course different ways of controlling of the field intensity distribution can be achieved depending on the use for which it is required, without thereby departing from the scope of the invention. For example, at least one of the insulating layers may be reinforced as an electrical insulator towards the high tension end of the cascade 25.

Of course it is also possible to cast the moulding compositions 27, 27a, and 27b in a mould and to shrink on a jacket 23 in a manner known in the synthetic plastics processing art. It is also possible, and in specific cases advantageous, in place of the moulding compositions 27, 27a and 27b the shrink individual insulating cylinders on to one another or to apply one or more further layers over the gun jacket 23, by means of an adhesive, cementing, moulding and/or pressing or shrinking, in order to improve the insulating properties and/or the mechanical or chemical properties of the overall arrangement.

Figure 8:
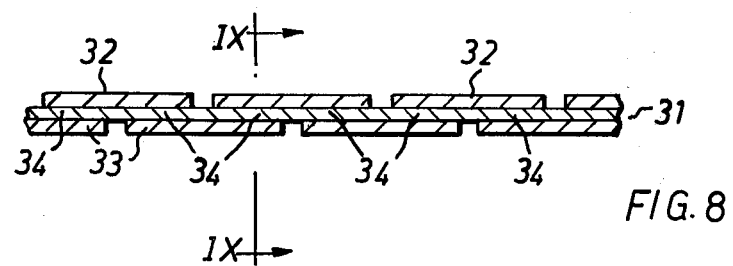
FIG. 8 is a lateral sectional elevation of a capacitor assembly.
Figure 9:
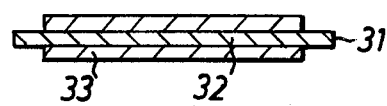
FIG. 9 is a section along the line IX—IX in FIG. 8.

As may be seen from FIGS. 8 and 9, a capacitor assembly consists of a dielectric 31 and capacitor plates 32, 33 arranged on both sides of the dielectric 31.

The capacitor plates 32, 33 are arranged on the dielectric 31 in such a way that the plates 32 on the one side of the dielectric overlap with the plates 33 of the other side of the dielectric and thus form a series of effective capacitor regions 34. The capacitor regions 34 formed by the overlapping of the capacitor plates 32, 33 are connected in series. The plates may consist of conductive layers applied to the dielectric, for example by vaporising metallic material onto the dielectric. Alternatively, the plates may consist of conductive metallic material secured by adhesive to the dielectric. As a further alternative the plates may consist of metal salt compounds which are applied in a liquid condition and then dried. In another alternative the plates, after preliminary fixing are made fast by a moulded insulating composition enveloping the plates and dielectric.

As may be seen several part capacitors or capacitor regions 34 are formed, the number of which is less by one than the number of the capacitor plates 32, 33.

Figure 10:
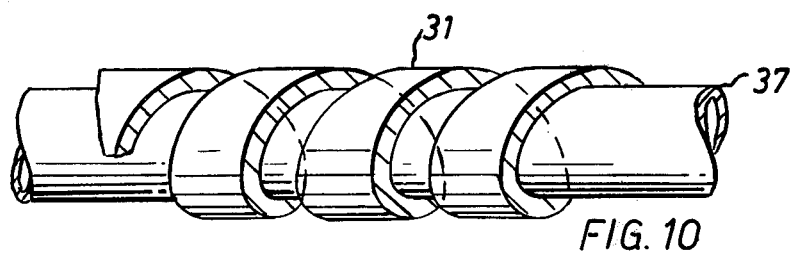
FIG. 10 is an elevation of a dielectric strip wound helically on to a coating material conduit in a spray gun.

FIG. 10 shows a form of the invention in which the dielectric 31 with the part capacitors is wound in helical form around a carrier 37 forming part of a spray gun whereby an extremely space-saving series-connection of the part capacitors with a large voltage distribution is achieved. The individual turns of the dielectric can alternatively be made to overlap partially; likewise the arrangement of several strips of the dielectric 31 lying parallel or one above the other is advantageous.

Figure 11:
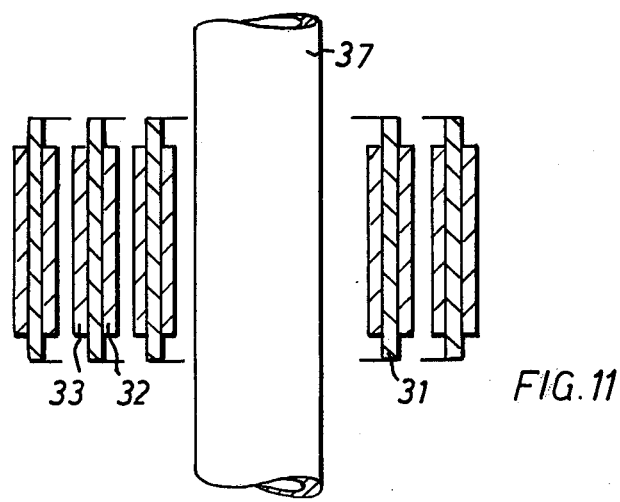
FIG. 11 is a cross-section showing a capacitor assembly wound in spiral form on to a coating material conduit in a spray gun.

The winding of the dielectric strip 31 can also be in the form shown in FIG. 11, where a winding of the dielectric 31 in spiral form around the carrier 37 for each cascade stage. Thus, likewise an optimum voltage distribution is achieved, while the capacitance value of each cascade stage can be increased almost as desired in an advantageous manner as a result of the winding of several layers. In this case the dielectric 31 has a number of part capacitors which correspond to the number of cascade stages.

Figure 12:
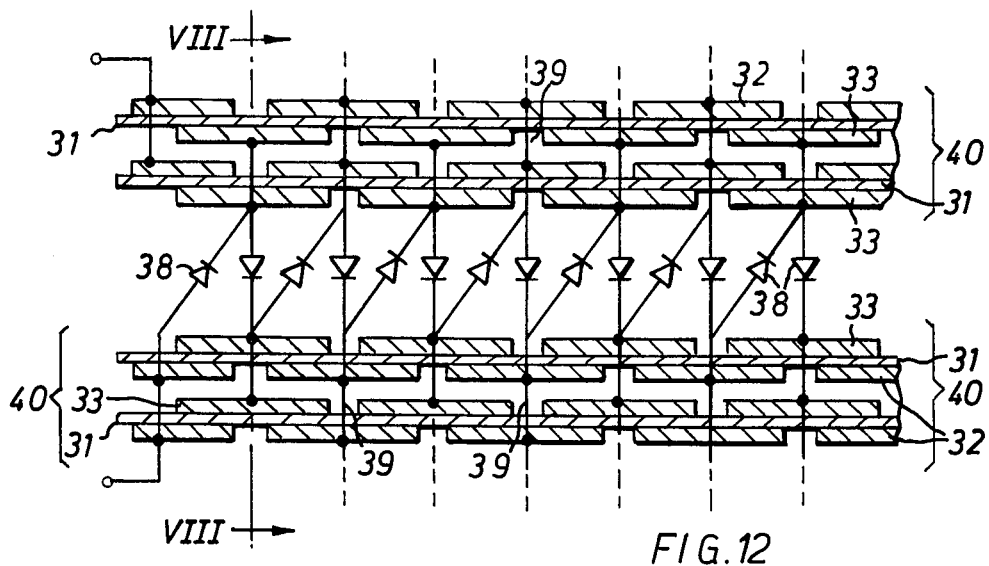
FIG. 12 is a section of a high-tension cascade formed from capacitor assemblies and diodes.
Figure 13:
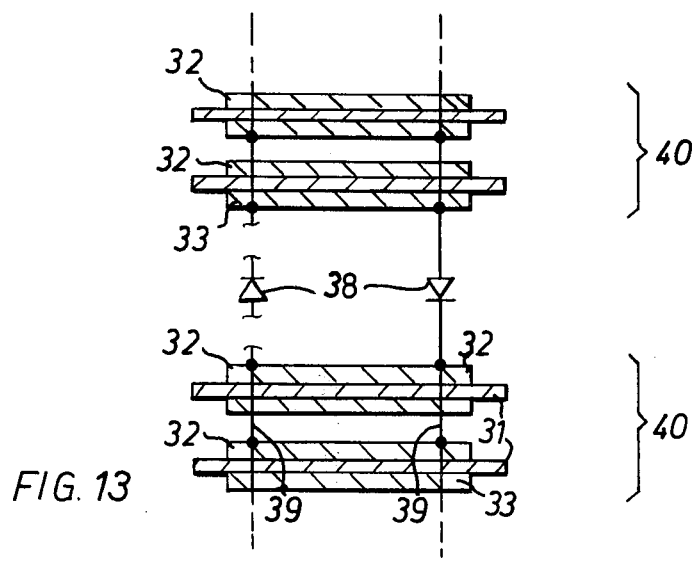
FIG. 13 shows a section along the line XIII—XIII in FIG. 12.

From FIGS. 12 and 13 a high-tension cascade formed from two strip packs 40 may be seen. Each strip pack 40 consists of several capacitor assemblies connected in parallel by means of connection wires 39. The strip packs 40 are connected with one another by means of diodes 38 to form a Greinacher high-tension cascade. As may be seen no terminals of any kind are needed for the electric and mechanical connection of the individual capacitor stages, since reliable connections are achieved exclusively by the connection wires 39 of the diodes 38.

Figure 14:
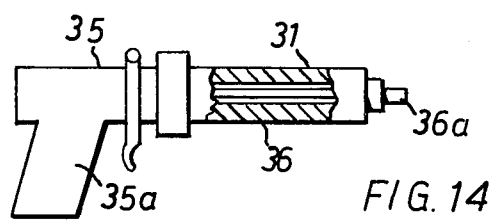
FIG. 14 is an elevation of a spray gun shown partly in section.

FIG. 14 shows an electrostatic generator block 41 arranged on an electro-static spray gun 35 and comprising a high-tenion cascade according to FIGS. 12 and 13. As may be seen such a block 41 provides an advantageous space-saving and weight-saving formation of the part capacitors and dielectric and the capacitor plates arranged thereon.

By suitable formation of the block 41 such a voltage distribution can be achieved that the full high tension is present only at the nuzzle end 36*a* and decreases constantly towards the handle part 35*a* to the value zero. The capacitor arrangement in the block 41 can advantageously be analogous with the arrangement of FIG. 13, and the conduit for coating material can be located in the centre of the generator between the strip packs 40.

Instead of being fitted on to the coating material conduit 36, the block 41 can also be mounted as desired elsewhere on the spray gun 35, as long as the components under high tension are sufficiently remote from the surface of the handle part 35*a*. The one-piece formation of spray gun 35 and block 41, for example as a synthetic plastics moulding, is practical and in certain cases advantgeous.

If in a manner known per se current-limiting or protective resistors are to be provided to limit the current flux in the event of flashover, these resistors can very advantageously be formed as layers with appropriately reduced conductivity applied to the dielectric. This can be effected advantageously if the capacitor plates themselves are formed as layers with reduced conductivity.

I claim:

1. A spray gun comprising a capacitor assembly for applying an electrostatic field to coating material being sprayed, said capacitor assembly having at least three capacitor plates of electrically conducting material, a solid dielectric formed with opposite faces on which said capacitor plates are mounted, said plates being mounted in alternation on said opposite faces with at least one plate on one of said faces partially overlapping two plates on the other of said faces thereby forming at least two part capacitors, each part capacitor consisting of a part of one of said plates on one of said faces, a part of another of said plates on the other of said faces and said dielectric, and the number of said part capacitors being in all less by one than the number of said plates, and means for connecting said part capacitors in series.

2. A spray gun according to claim 1, in which said dielectric is formed as a flat strip of dielectric material.

3. A spray gun according to claim 1, in which said plates consist of metallic material vaporized onto said dielectric.

4. A spray gun according to claim 19, in which said plates consist of a dried metal salt applied as a liquid to said dielectric.

5. A spray gun assembly according to claim 1, comprising a moulded insulating composition, applied over said plates and said dielectric, to augment the fixing of said plates to said dielectric.

6. A spray gun according to claim 1, in which said capacitor assembly comprises at least two flat strips of dielectric material, at least six capacitor plates of electrically conducting material, at least three of said capacitor plate being mounted in alternation on opposite faces of each said strip with at least one of said three plates located on one of said faces partially overlapping two of said three plates located on the other of said faces thereby forming at least two series connected part capacitors, each part capacitor consisting of a part of one of said plates on one of said faces, a part of another of said plates on the other of said faces and the associated dielectric strip, the number of part capacitors on each said strip being in all less by one than the number of plates on that strip, and said strips being mounted parallel to one another to provide a stack of at least two sets of part capacitors distributed along said strips.

7. A spray gun according to claim 2, comprising a carrier, said dielectric with said part capacitors being wound in helical form about said carrier.

8. A spray gun according to claim 2, comprising a carrier said dielectric with said part capacitors being wound in spiral form about said carrier.

9. A spray gun according to claim 6, comprising a plurality of diodes, plates on a first face on one said strip each being connected by way of a diode to a plate on a first face of a second said strip, plates on said first face on said second strip each being connected by way of a diode to a plate on the second face of said first said strip, and plates on said second face each being connected by way of a diode to a plate on the second face of said second said strip, whereby said plates are electrically connected in series alternately between said strips.

10. A spray gun according to claim 1, wherein said pack comprises two further said strips, said plates on one of said further strips being respectively electrically connected to said plates on said first strip, and the plates on the other of said further strips being respectively electrically connected to said plates on said second strip.

11. A spray gun according to claim 1, comprising a protective resistor applied to said dielectric between at least two of said mutually insulated capacitor plates.

12. A spray gun according to claim 11, in which at least one of said capacitor plates is formed at least partially from material of reduced conductivity serving as a protective resistor.

13. An electrostatic spray gun comprising a conduit through which coating material is projected and having a muzzle and an inlet end, a handle part enabling the gun to be manually supported and on which said inlet end of said conduit is mounted and an electrostatic generator constituted by a capacitor assembly according to claim 1, distributed along said conduit to provide an electrostatic tension increasing from said handle to said muzzle.

* * * * *